(12) United States Patent
Cathey et al.

(10) Patent No.: US 11,847,615 B2
(45) Date of Patent: Dec. 19, 2023

(54) SYSTEM AND METHOD FOR JOB PROFILE MATCHING

(71) Applicant: Randstad N.V., Diemen (NL)

(72) Inventors: Glen Evan Cathey, Diemen (NL); Matthias Feys, Diemen (NL)

(73) Assignee: RANDSTAD N.V., Diemen (NL)

( * ) Notice: Subject to any disclaimer, the term of this patent is extended or adjusted under 35 U.S.C. 154(b) by 341 days.

(21) Appl. No.: 17/104,608

(22) Filed: Nov. 25, 2020

(65) Prior Publication Data
US 2021/0158296 A1 May 27, 2021

(30) Foreign Application Priority Data

Nov. 26, 2019 (NL) ...................................... 2024312

(51) Int. Cl.
*G06Q 10/1053* (2023.01)
*G06N 3/08* (2023.01)
(Continued)

(52) U.S. Cl.
CPC ......... *G06Q 10/1053* (2013.01); *G06N 3/045* (2023.01); *G06N 3/08* (2013.01);
(Continued)

(58) Field of Classification Search
None
See application file for complete search history.

(56) References Cited

U.S. PATENT DOCUMENTS

| | | | | |
|---|---|---|---|---|
| 7,502,748 B1 * | 3/2009 | Baldwin | ................ | G06Q 10/06 705/7.14 |
| 2010/0153290 A1 * | 6/2010 | Duggan | ................ | G06Q 30/08 705/321 |

(Continued)

FOREIGN PATENT DOCUMENTS

| | | | | |
|---|---|---|---|---|
| EP | 3800560 A1 * | 4/2021 | ........... | G06F 16/316 |
| WO | WO-0184345 A2 * | 11/2001 | ............. | G06Q 40/04 |
| WO | WO-2014011045 A1 * | 1/2014 | ............. | G06Q 10/10 |

OTHER PUBLICATIONS

Sunarti (Application Profile Matching Method for Employees Online Recruitment), International Conference on Environment and Technology (IC-Tech) 2017, pp. 1-7 (Year: 2017).*

(Continued)

*Primary Examiner* — Romain Jeanty
(74) *Attorney, Agent, or Firm* — NIXON PEABODY LLP; Jeffrey L. Costellia

(57) ABSTRACT

A computer-implemented system for job matching of candidates and vacancies, comprises: a candidate memory storing data of at least one candidate profile associated with a respective candidate and consisting of a plurality of different candidate categories, wherein each candidate category comprises candidate category data associated with the candidate; and a vacancy memory storing data of at least one vacancy profile associated with a respective vacancy and consisting of a plurality of different vacancy categories, wherein each vacancy category comprises vacancy category data associated with the vacancy. A matching module is configured to receive the at least one candidate profile, receive the at least one vacancy profile, determine at least one similarity score between the at least one candidate profile and the at least one vacancy profile, and determine a job matching result based on the at least one similarity score. An information module is configured to communicate the job matching result to a user. A feedback module is configured to receive feedback information associated with at least one of the plurality of candidate categories and the plurality of vacancy categories. The matching module is updated based on the received feedback information.

22 Claims, 13 Drawing Sheets

(51) Int. Cl.
*G06Q 10/105* (2023.01)
*G06Q 30/018* (2023.01)
*G06Q 30/0203* (2023.01)
*G06Q 30/08* (2012.01)
*G06N 3/045* (2023.01)
*G06F 18/22* (2023.01)
*G06F 18/40* (2023.01)
*G06F 18/214* (2023.01)

(52) U.S. Cl.
CPC ......... *G06Q 10/105* (2013.01); *G06Q 30/018* (2013.01); *G06Q 30/0203* (2013.01); *G06Q 30/08* (2013.01); *G06F 18/2148* (2023.01); *G06F 18/22* (2023.01); *G06F 18/40* (2023.01)

(56) References Cited

U.S. PATENT DOCUMENTS

| | | | |
|---|---|---|---|
| 2012/0330822 A1* | 12/2012 | McGovern | G06Q 10/1053 705/321 |
| 2015/0170103 A1* | 6/2015 | Garg | G06Q 10/1053 705/321 |
| 2015/0248650 A1 | 9/2015 | Nakamura et al. | |
| 2017/0193450 A1* | 7/2017 | Potratz | G06Q 10/105 |
| 2020/0104315 A1* | 4/2020 | Winzenried | G06F 16/367 |

OTHER PUBLICATIONS

May et al. "Intelligent job matching with self-learning recommendation engine", Mar. 2015, Procedia Manufacturing, pp. 1959-1965 (Year: 2015).*
Mavrovouniotis et al., "Hierarchical Neural Networks", Computers & Chem. Engineering, vol. 16, No. 4, 1992, pp. 347-369.
Netherlands Search Report for 2024312, dated Mar. 2020.
Netherlands Written Opinion for 2024312, dated Mar. 2020.

* cited by examiner

SYSTEM AND METHOD FOR JOB PROFILE MATCHING

FIELD OF THE INVENTION

The present invention relates to systems and methods for job profile matching. In particular, the present invention relates to a computer implemented system and method to match a job profile associated with a job candidate to other job profiles.

BACKGROUND OF THE INVENTION

Finding a suitable candidate for a job or vacancy is a cornerstone of any work environment. Similarly this is true for finding a suitable job or vacancy that matches a candidate's profile. Generally, one may refer to such kind of matching as 'job profile matching'. Such a concept may also be known e.g. as 'job recommendation', 'employee selection', 'identifying candidates for job openings' etc.

Job profile matching still relies to a large extent on manual work, wherein people compare various aspects of profiles and determine whether or not e.g. a candidate's profile matches the profile or requirements associated with a job or vacancy. However, in recent years the prevalence of computers caused an ever increasing effort to further automate the process of job profile matching. Having on one hand digitalized data of job descriptions and/or job requirements, and having on the other hand digitalized data associated with a candidate, it is natural to wonder how both sides can be compared with each other in an efficient and reliable manner with the aid of a computer. In particular, finding, in an automated manner, the best or most promising matches between e.g. candidates and vacancies would be useful. And although the general idea of automated job profile matching may be straightforward, the technical realization of any system capable of such a job profile matching certainly is not. Nevertheless, various systems and methods for job profile matching have been proposed.

For example, document U.S. Pat. No. 8,914,383 B1 discloses a system and method for providing job recommendations based on user behaviour or characteristics. The job recommendations are configured in accordance with a data set based on relational analysis of previous users' activity, or matches between job postings and the user's resume or user profile information. The presentation of job recommendations is triggered, configured, and provided transparently to the user.

The further development of machine learning techniques and the applicability of those techniques also led to the use of machine learning in job profile matching. Machine learning techniques may offer the ability to improve a job profile matching system outcome quality by providing feedback on the quality of past outcomes. In case a candidate is proposed for a job based on the candidate's profile who eventually appears to be unsuitable, a negative feedback by a user may improve a job profile matching algorithm.

For example, document U.S. Pat. No. 7,472,097 B1 discloses a plurality of neural networks or other models which can be used in employee selection technologies. A hiring recommendation can be based at least on processing performed by a plurality of neural networks. For example, parallel or series processing by neural networks can be performed. A neural network can be coupled to one or more other neural networks. A binary or other n-ary output can be generated by one or more of the neural networks. In a series arrangement, candidates can be processed sequentially in multiple stages, and those surviving the stages are recommended for hire.

In a further example, document WO 2019/023358 A1 discloses a machine learning algorithm which is used to train a deep semantic similarity neural network to output a semantic similarity score between a candidate job query and a candidate job search result. This semantic similarity score can then be used in a ranking phase to rank job search results in response to a first job search query.

However, the existing systems and methods using neural networks, or machine learning techniques in general, to match job candidate profiles to other profiles such as vacancies, have the drawback that training or re-training a neural network or a machine learning algorithm based on feedback provided by a user is still computational intensive and inefficient, while the matching results may be inadequate.

SUMMARY OF THE INVENTION

It would be desirable to provide a computer-implemented system and method for job profile matching that are more efficient to train or re-train based on feedback provided by a user.

In a first aspect of the invention, a computer-implemented system for job matching of candidates and vacancies is provided. The system comprises:
a candidate memory comprising data of at least one candidate profile, wherein each candidate profile is associated with a respective candidate and consists of a plurality of different candidate categories, wherein each candidate category comprises candidate category data associated with the candidate;
a vacancy memory comprising data of at least one vacancy profile, wherein each vacancy profile is associated with a respective vacancy and consists of a plurality of different vacancy categories, wherein each vacancy category comprises vacancy category data associated with the vacancy;
a matching module, connected in communication to the candidate memory and the vacancy memory, the matching module being configured to:
receive the at least one candidate profile;
receive the at least one vacancy profile;
determine at least one similarity score between the at least one candidate profile and the at least one vacancy profile; and
determine a job matching result based on the at least one similarity score;
an information module, connected in communication to the matching module, the information module being configured to communicate the job matching result to a user; and
a feedback module, connected in communication to the matching module, the feedback module being configured to receive feedback information from the user on at least part of the job matching result, wherein the feedback information is associated with at least one of the plurality of candidate categories and the plurality of vacancy categories, and to update the matching module based on the received feedback information.

In an embodiment, the matching module comprises an encoding module configured to encode candidate category data and vacancy category data.

In an embodiment, the matching module further comprises:
- a plurality of candidate category neural networks, wherein each one of the candidate category neural networks is associated with a respective candidate category and wherein a respective candidate category neural network is configured to receive the candidate category data and to determine a respective candidate category representation for each candidate;
- a candidate super-category neural network, configured to receive a plurality of candidate category representations and to determine a candidate super-category representation for each candidate;
- a plurality of vacancy category neural networks, wherein each one of the vacancy category neural networks is associated with a respective vacancy category and wherein a respective vacancy category neural network is configured to receive the vacancy category data and to determine a respective vacancy category representation for each vacancy; and
- a vacancy super-category neural network, configured to receive a plurality of vacancy category representations and to determine a vacancy super-category representation for each vacancy, wherein the matching module further comprises a decision network, configured to receive at least one candidate super-category representation and at least one vacancy super-category representation, the decision network further being configured to determine at least one similarity score between the at least one candidate super-category representation and the at least one vacancy super-category representation.

In an embodiment, each similarity score is determined based on a mathematical distance between a respective candidate super-category representation and a respective vacancy super-category representation.

In an embodiment, the matching module comprises at least one category comparison network, configured to receive a candidate category representation and an associated vacancy category representation, the category comparison network further being configured to determine a category similarity score between the candidate category representation and the associated vacancy category representation.

A category comparison network is configured to compare a candidate category representation and an associated vacancy category representation and to determine a category similarity score. The category comparison network may be, or may comprise a neural network, however also other networks to compare the two representations are possible.

For example, the category comparison network may determine the category similarity score by determining a cosine similarity between the candidate category representation and the associated vacancy category representation.

In an embodiment, the candidate category neural networks are substantially equal to the respective vacancy category neural networks.

In an embodiment, the candidate super-category neural network is substantially equal to the vacancy super-category neural network.

In an embodiment, at least one candidate category is selected from a group of candidate categories comprising: skills, experiences, educations, languages, certificates and preferences.

In an embodiment, the feedback information received by the feedback module is associated with at least one of a specific candidate category and a specific vacancy category, and wherein the candidate category neural network associated with the specific candidate category is updated based on the information associated with the specific candidate category, and wherein the vacancy category neural network associated with the specific vacancy category is updated based on the information associated with the specific vacancy category.

In an embodiment, the feedback information received by the feedback module is associated with at least one of a specific candidate category and a specific vacancy category, and wherein the candidate super-category neural network is updated based on the information associated with the specific candidate category, and wherein the vacancy super-category neural network is updated based on the information associated with the specific vacancy category.

In an embodiment, the updating comprises the use of back-propagation in combination with a cross-entropy loss function.

In an embodiment, the feedback module further is configured to:
- associate the feedback information with a cost function;
- associate the cost function with at least one of the plurality of candidate category neural networks, plurality of vacancy category neural networks, candidate super-category neural network or vacancy super-category neural network; and
- optimize a cost associated with the cost function by updating at least one of the plurality of candidate category neural networks, plurality of vacancy category neural networks, candidate super-category neural network or vacancy super-category neural network, associated with the respective cost function.

In an embodiment, the feedback module further is configured to:
- associate the received feedback information with a type of feedback; and
- determine the cost function based on the type of feedback.

In an embodiment, the feedback module further is configured to:
- determine on which categories feedback information is received, wherein the categories are selected from the candidate categories and the vacancy categories; and
- determine the type of feedback based on the categories on which feedback information is received.

The use of a plurality of candidate category neural networks and a plurality of vacancy category neural networks according the invention provides the possibility to associate one or more candidate categories in a candidate profile with corresponding candidate category neural networks, and to associate one or more vacancy categories in a vacancy profile with corresponding vacancy category neural networks.

The effect or advantage is that the job matching results may be scored on category level, allowing freedom to rank job matching results based on different categories of the candidate profile or vacancy profile.

Also, weights of some of the candidate category neural networks and vacancy category neural networks, as well as the associated candidate super-category neural network and the vacancy super-category neural network may be fixed during updating or retraining to focus on updating only one, or some of the neural networks. If obtained feedback information indicates that candidate profile data or vacancy profile data in one or more specific categories has a big impact on the job matching result or on the user feedback, only these candidate neural networks and/or vacancy neural networks may be updated, while all other candidate category neural networks and/or vacancy category neural networks may not be updated. This may allow to allocate processing or computing power to updating the specific category neural networks which are associated with the categories which may have a big impact on the job matching result, resulting in a more efficiently operating system yielding better job matching results.

Furthermore, a representation of the job market may be obtained or learned on a category level. For example, a category neural network associated with job experiences represents the job market by relations between different job types, while a category neural network associated with skills represents the job market by relations between different skills.

Also, category similarity scores provide insights into which parts of a candidate profile or vacancy profile were deciding factors in the final result. This improves the interpretability of the system outcome, providing useful information on how the system and the neural networks may be further optimized.

By associating a cost function with the received feedback information, and associating the cost function with at least one of the plurality of candidate category neural networks, the plurality of vacancy category neural networks, the candidate super-category neural network or the vacancy super-category neural network, it is possible to train or update specific neural networks based on the received feedback information, namely only the neural networks of which the associated representation, such as a category representation or a vacancy representation, contributes to the cost associated with the cost function.

By selectively training only some of the neural networks, less processing power is required to update or train the computer-implemented system for job matching of candidates and vacancies, since parts of the system may kept unaltered. Similarly, by keeping some neural networks constant reduces the complexity which generally results in convergence to the newly updated neural networks in fewer iterations, saving processing time.

In case new candidate categories or vacancy categories are introduced in the candidate profile and/or vacancy profile, the modular design of the system according to the present invention permits to reuse existing candidate category neural networks and existing vacancy category neural networks, and requires only adding new neural networks associated with the new categories. Furthermore, existing cost functions may be reused and only new cost functions have to be introduced which are associated with the newly added neural networks. Consequently, the computer-implemented system for job matching of candidates and vacancies according to the present invention may be easier to update or to keep up-to-date than other systems for job matching.

The system may also be easily extended with new categories by adding respective new category neural networks, without losing already learned information from the existing categories. A new category neural network may be added, which may only require to update or adjust the super-category neural networks.

In a second aspect of the present invention, a computer-implemented method for job matching of candidates and vacancies is provided. The method comprises a computer system carrying out the steps of:

receiving data of at least one candidate profile, wherein each candidate profile is associated with a respective candidate and consists of a plurality of different candidate categories, wherein each candidate category comprises candidate category data associated with the candidate;

receiving data of at least one vacancy profile, wherein each vacancy profile is associated with a respective vacancy and consists of a plurality of different vacancy categories, wherein each vacancy category comprises vacancy category data associated with the vacancy;

determining at least one similarity score between the at least one candidate profile and the at least one vacancy profile;

determining a job matching result based on the at least one similarity score;

communicating the job matching result to a user;

receiving feedback information from the user on at least part of the job matching result, wherein the feedback information is associated with at least one of the plurality of candidate categories and the plurality of vacancy categories; and updating the determination of the at least one similarity score, based on the received feedback information.

In an embodiment, the method further comprises:

receiving, by a candidate category neural network, the candidate category data, wherein the candidate category neural network is one of a plurality of candidate category neural networks, and wherein each one of the candidate category neural networks is associated with a respective candidate category;

determining, by the respective candidate category neural network, a respective candidate category representation for each candidate;

receiving, by a candidate super-category neural network, a plurality of candidate category representations;

determining, by the candidate super-category neural network, a candidate super-category representation for each candidate;

receiving, by a vacancy category neural network, the vacancy category data, wherein the vacancy category neural network is one of a plurality of vacancy category neural networks, and wherein each one of the vacancy category neural networks is associated with a respective vacancy category;

determining, by the respective vacancy category neural network, a respective vacancy category representation for each vacancy;

receiving, by a vacancy super-category neural network, a plurality of vacancy category representations;

determining, by the vacancy super-category neural network, a vacancy super-category representation for each vacancy;

receiving, by a decision network, at least one candidate super-category representation and at least one vacancy super-category representation; and determining, by the decision network, at least one similarity score between the at least one candidate super-category representation and the at least one vacancy super-category representation.

In an embodiment, the method further comprises:

providing at least one category comparison network;

receiving, by the at least one category comparison network, a candidate category representation and an associated vacancy category representation; and determining, by the category comparison network, a category similarity score between the candidate category representation and the associated vacancy category representation.

In an embodiment, wherein the received feedback information is associated with at least one of a specific candidate category and a specific vacancy category, the method further comprises:
- updating the candidate category neural network associated with the specific candidate category, based on the feedback information associated with the specific candidate category; and
- updating the vacancy category neural network associated with the specific vacancy category, based on the feedback information associated with the specific vacancy category.

In an embodiment, wherein the received feedback information is associated with at least one of a specific candidate category and a specific vacancy category, the method further comprises:
- updating the candidate super-category neural network, based on the feedback information associated with the specific candidate category; and
- updating the vacancy super-category neural network, based on the feedback information associated with the specific vacancy category.

In an embodiment, the method further comprises the computer system carrying out the steps of:
- associating the feedback information with a cost function;
- associating the cost function with at least one of the plurality of candidate category neural networks, plurality of vacancy category neural networks, candidate super-category neural network or vacancy super-category neural network; and
- optimizing a cost associated with the cost function by updating at least one of the plurality of candidate category neural networks, plurality of vacancy category neural networks, candidate super-category neural network or vacancy super-category neural network, associated with the respective cost function.

In an embodiment, associating a cost function with the feedback information comprises:
- associating the received feedback information with a type of feedback; and
- determining the cost function based on the type of feedback.

In an embodiment, associating the received feedback information with a type of feedback comprises:
- determining on which categories feedback information is received, wherein the categories are selected from the candidate categories and the vacancy categories; and
- determining the type of feedback based on the categories on which feedback information is received.

In a third aspect of the present invention, a method of training a computer-implemented system for job matching of candidates and vacancies is provided, the system comprising:
- a candidate memory comprising data of at least one candidate profile, wherein each candidate profile is associated with a respective candidate and consists of a plurality of different candidate categories, wherein each candidate category comprises candidate category data associated with the candidate;
- a vacancy memory comprising data of at least one vacancy profile, wherein each vacancy profile is associated with a respective vacancy and consists of a plurality of different vacancy categories, wherein each vacancy category comprises vacancy category data associated with the vacancy;
- a matching module, connected in communication to the candidate memory and the vacancy memory, the matching module being configured to:
  - receive the at least one candidate profile;
  - receive the at least one vacancy profile;
  - determine at least one similarity score between the at least one candidate profile and the at least one vacancy profile; and
  - determine a job matching result based on the at least one similarity score;
- an information module, connected in communication to the matching module, the information module being configured to communicate the job matching result to a user; and
- a feedback module, connected in communication to the matching module, the feedback module being configured to receive feedback information from the user on at least part of the job matching result, wherein the training method comprises the steps of:
associating the feedback information with at least one of the plurality of candidate categories and the plurality of vacancy categories, and updating the step of determining of the at least one similarity score between the at least one candidate profile and the at least one vacancy profile by the matching module based on the received feedback information.

In an embodiment, the matching module further comprises:
- a plurality of candidate category neural networks, wherein each one of the candidate category neural networks is associated with a respective candidate category and wherein a respective candidate category neural network is configured to receive the candidate category data and to determine a respective candidate category representation for each candidate; and
- a plurality of vacancy category neural networks, wherein each one of the vacancy category neural networks is associated with a respective vacancy category and wherein a respective vacancy category neural network is configured to receive the vacancy category data and to determine a respective vacancy category representation for each vacancy, wherein the training method further comprises the steps of:
determining at least one similarity score between the at least one candidate profile and at least one vacancy profile by determining a similarity score between at least one candidate category representation and at least one vacancy category representation; and
associating the feedback information with at least one of the plurality of candidate category representations and the plurality of vacancy category representations, and updating at least one of the candidate category neural networks and the vacancy category neural networks, respectively, based on the received feedback information.

In an embodiment, the matching module further comprises:
- a candidate super-category neural network, configured to receive a plurality of candidate category representations and to determine a candidate super-category representation for each candidate; and
- a vacancy super-category neural network, configured to receive a plurality of vacancy category representations and to determine a vacancy super-category representation for each vacancy, wherein the training method further comprises the steps of:
determining at least one similarity score between the at least one candidate profile and at least one vacancy profile by determining a similarity score between at least one candidate super-category representation and at least one vacancy super-category representation; and associating the feedback information with at least one of the plurality of candidate super-category representations and the plurality of vacancy super-category representations, and updating at least one of the candidate super-category neural networks and the vacancy super-category neural networks, respectively, based on the received feedback information.

These and other aspects of the invention will be more readily appreciated as the same becomes better understood by reference to the following detailed description and considered in connection with the accompanying drawings in which like reference symbols designate like parts.

DETAILED DESCRIPTION OF EMBODIMENTS

Figure 1:
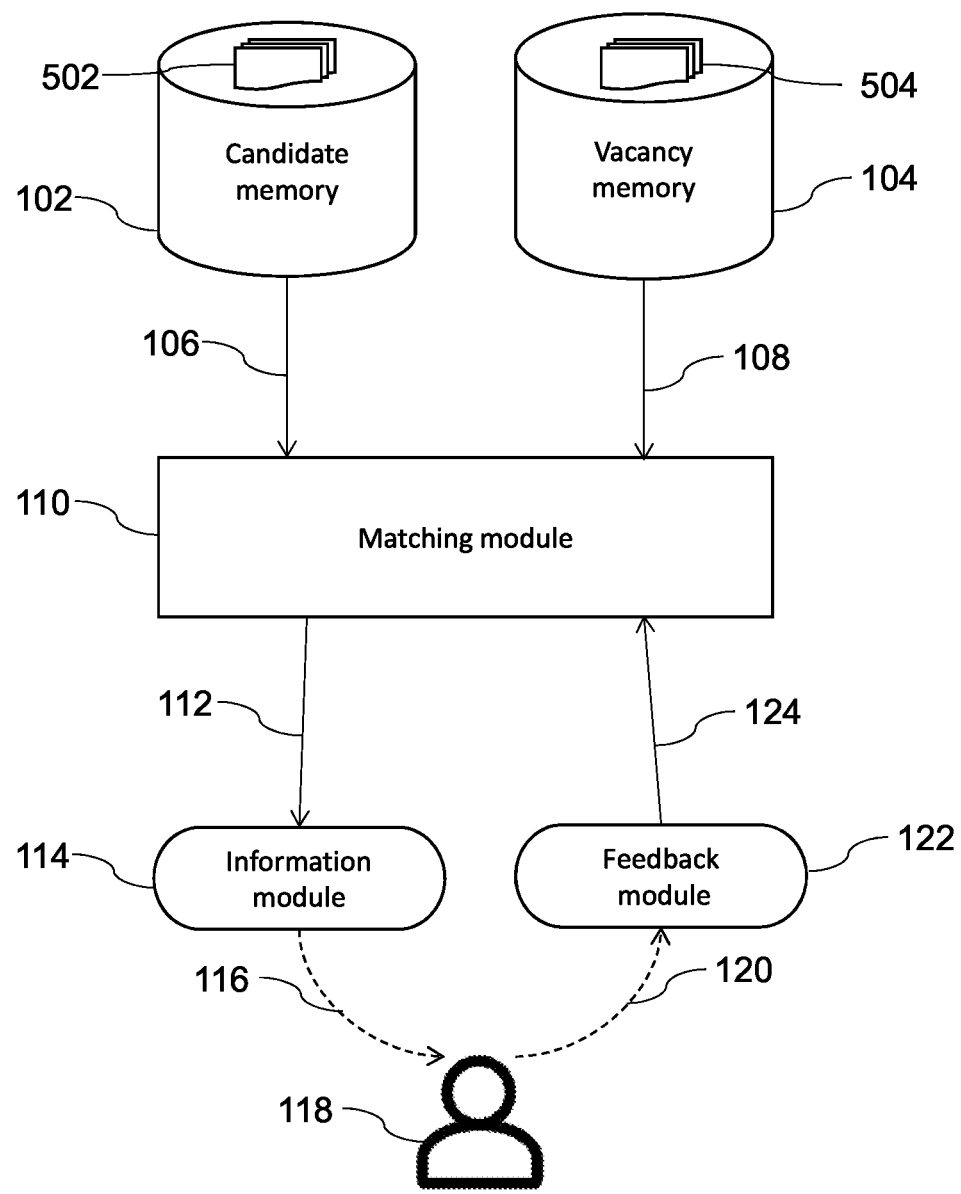
FIG. 1 depicts an embodiment for a computer-implemented system for job matching of candidates and vacancies.

In FIG. 1 depicts an embodiment of a computer-implemented system for job matching of candidates and vacancies. FIG. 1 also depicts a user 118 using the system.

The system may be used to compare a single candidate with a plurality of vacancies to find the best job for the candidate. Also, the system may be used to compare a plurality of candidates with a single vacancy to find the best candidate for a particular vacancy.

In the system, each module and network comprises computer code including computer instructions enabling a processor of a data processing unit to perform the function associated with a particular module or network. In some embodiments, one or more processors which, when loaded with the computer instructions, perform the function associated with a particular module or network, are included in the module or network. In some embodiments, a processor may perform functions associated with several modules and/or networks. In other embodiments, several processors may perform a function associated with a particular module of network. In some embodiments, processors may be physically distributed in a network.

The term memory may refer to a transitory memory, a non-transitory memory or combinations thereof. In essence, a memory may be any computer hardware or storage medium which is suitable for storing data. For the system at hand, typically hard disk drives (HDDs), solid state drives (SSDs) and random access memory (RAM) are used. A memory may refer to a single hardware component, but may also refer to a plurality of components that collectively store data, which is often the case when using servers having a form of data redundancy or when using cloud storage.

The system comprises a candidate memory 102. The candidate memory 102 comprises data of at least one candidate profile 502, see also FIG. 5. However, in practice often (many) more than one candidate profile are stored in the candidate memory. The data may be stored in a database.

The respective data in the candidate memory may be obtained by storing, copying or saving candidate profiles from other sources. For example, a person may provide manually, e.g. via a computer terminal having a user interface, data associated with a candidate profile 502 and store the data in the candidate memory 102. Additionally or alternatively, information sources, e.g. a C.V. associated with the candidate, may be processed automatically by a computing system, possibly comprising a scanner to digitize non-digitized alphanumerical and graphical information, to extract a candidate profile 502, where after the candidate profile 502 may be stored in the candidate memory 502. Also, the data of the at least one candidate profile 502 may be copied from another memory.

Each candidate profile 502 is associated with a respective candidate. Therefore, a candidate profile may comprise the name of the candidate and/or may comprise an identifier which may be linked to the candidate's name. Each candidate profile contains information associated with the candidate which is at least partly relevant to match the candidate to a vacancy. The candidate profile consists of a plurality of different candidate categories, wherein each candidate category comprises candidate category data associated with the candidate. Typical categories are skills, experiences, educations, languages, certificates and preferences, wherein the respective candidate category data contains specific information on the candidate with respect to the respective category. For example, within the category languages, it may be listed which languages a candidate speaks. As another example, within the category education, it may be listed which education the candidate enjoyed. A candidate profile may also contain other information not related to a category.

Figure 5:
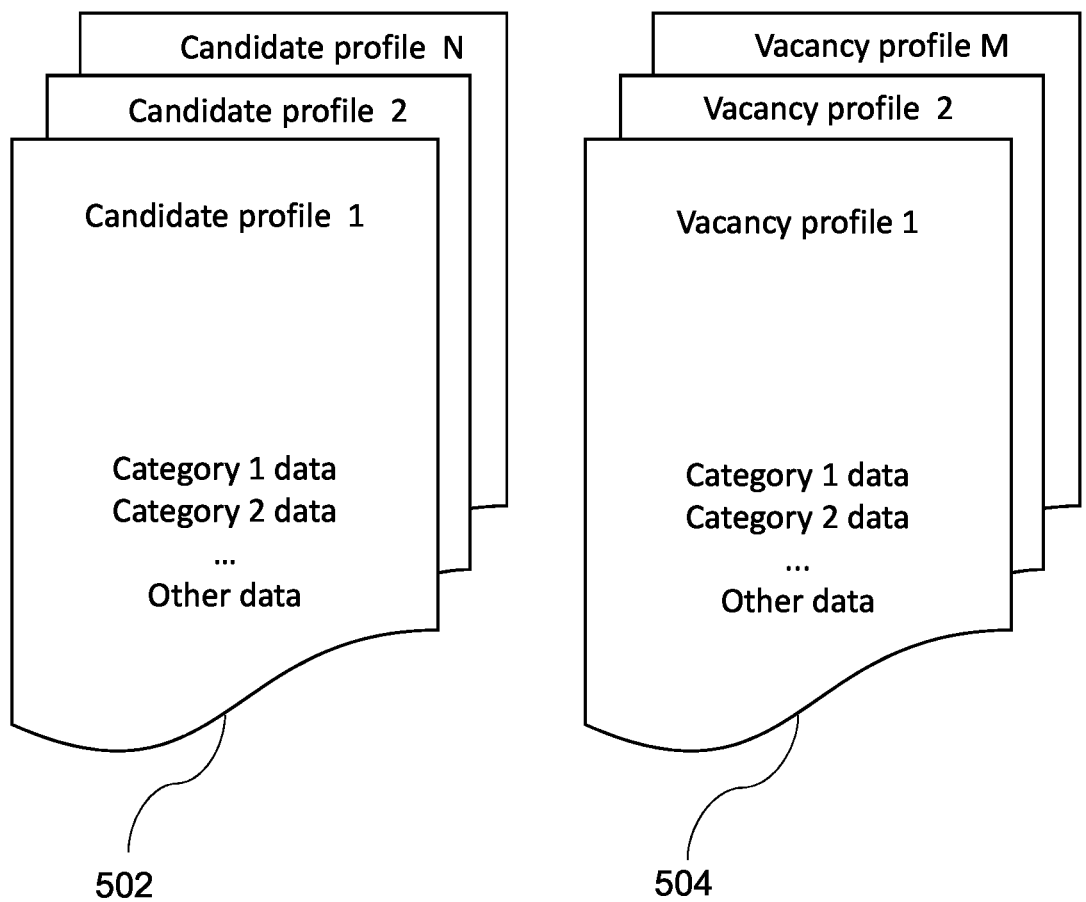
FIG. 5 depicts an embodiment of candidate profiles and vacancy profiles.

The system also comprises a vacancy memory 104 comprising data of at least one vacancy profile 504, see also FIG. 5. Data corresponding to a vacancy profile 504 may be obtained similarly as data corresponding to a candidate profile 502, as explained above. A vacancy profile 504 is similar to a candidate profile 502, with the difference that a vacancy profile 504 is associated with a possible job opening, wherein the vacancy profile 504 contains information on requirements or preferences on a candidate. Each vacancy profile 504 is associated with a respective vacancy and consists of a plurality of different vacancy categories. Each vacancy category comprises vacancy category data associated with the vacancy. Typically, the vacancy categories are the same as the candidate categories. However, it is also possible that only some of the vacancy categories and the candidate categories are the same.

The candidate memory 102 and the vacancy memory 104 may be part of a single memory. The candidate profile 502 and the vacancy profile 504 may even be stored in the same database. On the other hand, the candidate memory 102 and the vacancy memory 104 may also be physically separated. For example, a candidate memory 102 may be located at a local computer, whereas the vacancy memory 104 may be located on a remote server.

The system further comprises a matching module 110. The matching module 110 is connected in communication to the candidate memory 102 and the vacancy memory 104. The connection may be established by any communication structure that is suitable for transmitting data. The connection may be wired or may be wireless. The matching module 110 is configured to receive 106 the at least one candidate profile 502 and to receive 108 the at least one vacancy profile 504. Arrows 106 and 108 indicate the main direction of the flows of data or information. However, data may also be submitted by the matching module 110 to the candidate memory 102 or the vacancy memory 104. For example, the matching module 110 may query a memory.

For all Figures it is the case that arrows indicate the most relevant direction of information or data transmission, but no arrow should be interpreted such that exclusively in the direction of the arrow information is exchanged. In fact, once data or information is transmitted from one component to another, often a confirmation is returned.

The matching module 110 is configured to process candidate profiles 502 and vacancy profiles 504. Based on the candidate category data and the vacancy category data, the matching module 110 determines at least one similarity score between the at least one candidate profile 502 and the at least one vacancy profile 504. The similarity score is indicative for how well a candidate matches a vacancy. For example, the minimum score may be zero, indicating no match, whereas one may be the maximum score, indicating a full match. Any other number between zero and one then indicates a partial match.

Multiple similarity scores may be determined. For example, a similarity score for every category may be determined. Various similarity scores may be combined to obtain another similarity score. For example, an overall similarity score may be obtained by determining a (weighted) average of the category similarity scores.

The matching module 110 then determines a job matching result based on the at least one similarity score. For example, there may be a minimum similarity score at which a candidate may be considered suitable for a job associated with a vacancy. Also, candidates or vacancies may be ranked based on the similarity scores.

Figure 2:
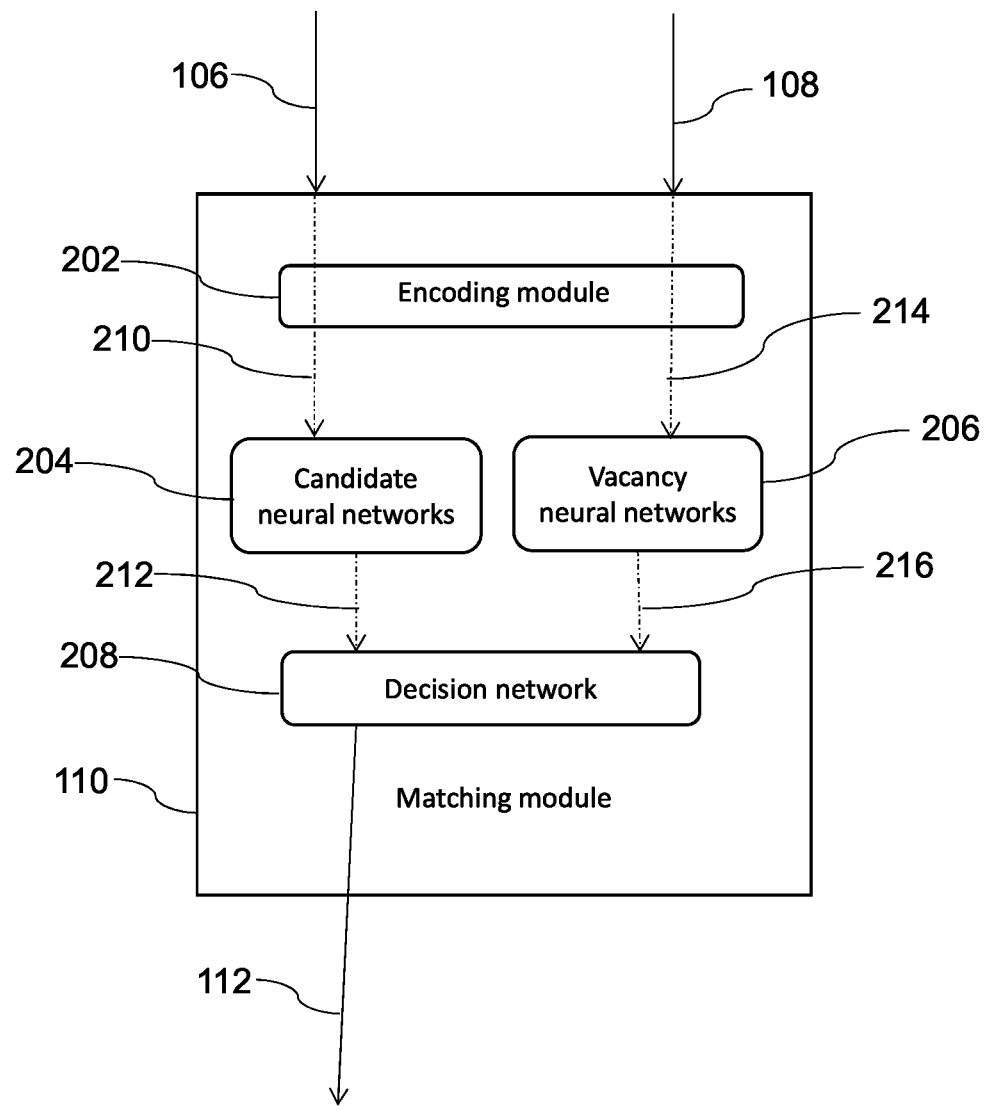
FIG. 2 depicts an embodiment of a matching module, wherein the matching module is used for matching a candidate and a vacancy.
Figure 3:
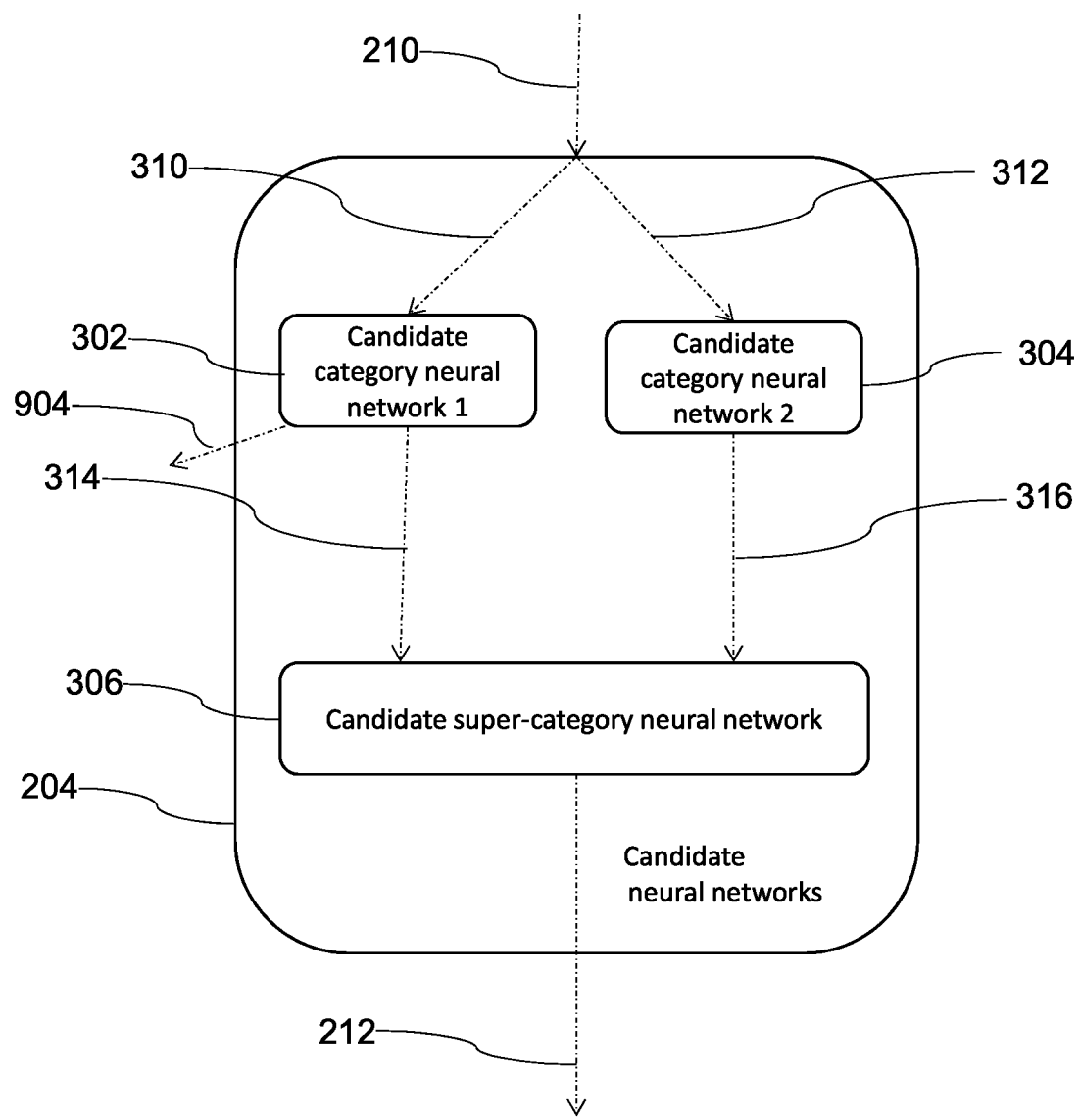
FIG. 3 depicts in more detail the candidate neural networks of FIG. 2.
Figure 4:
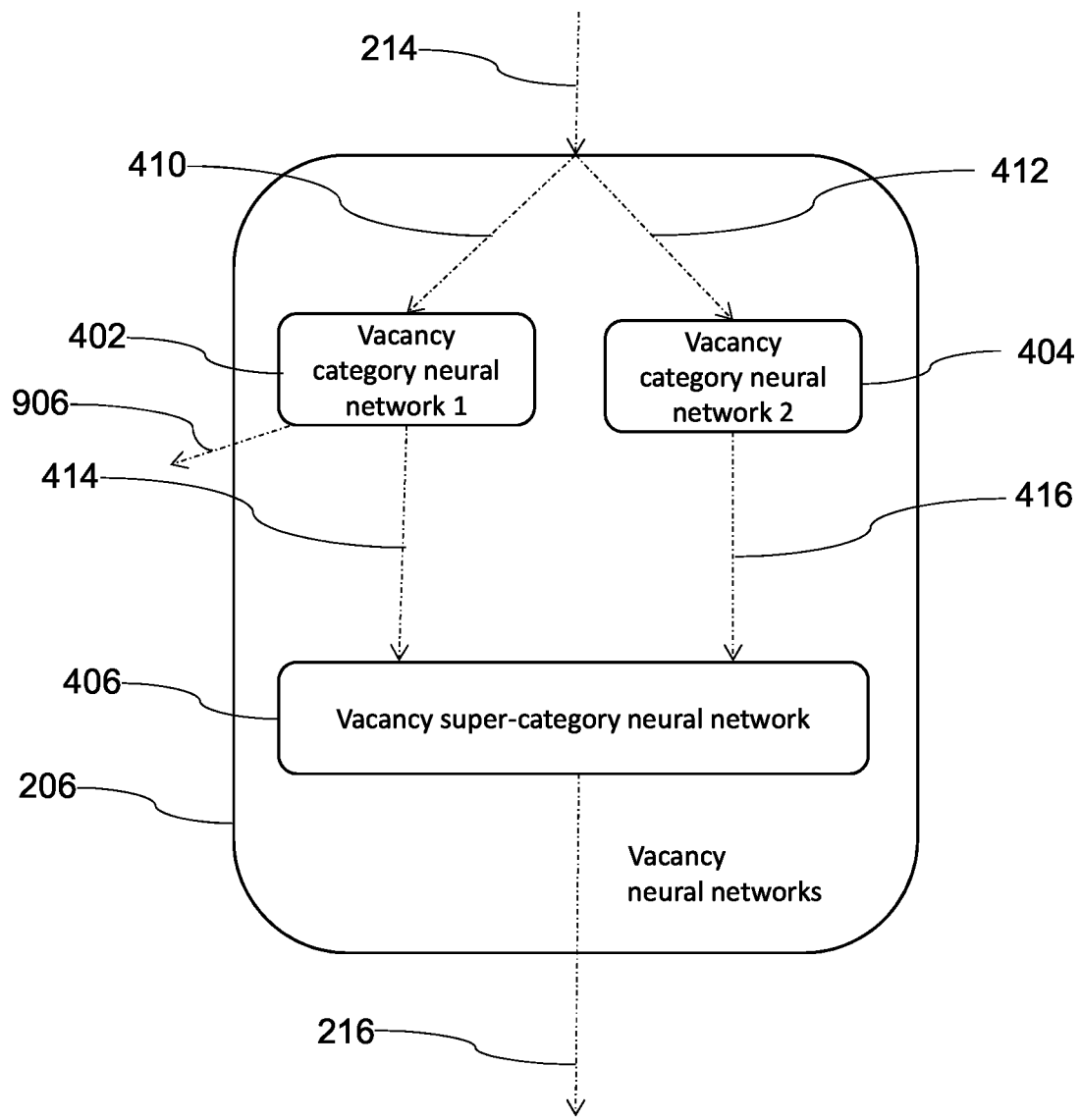
FIG. 4 depicts in more detail the vacancy neural networks of FIG. 2.

FIGS. 2 to 4, to be discussed below, further illustrate how the matching module 110 compares candidate profiles 502 and vacancy profiles 504.

Once the job matching result is determined, the job matching result is communicated to an information module 114. The information module 114 is connected 112 in communication to the matching module 110. The information module 114 configured to communicate 116 the job matching result to a user 118. To do so, the information module 114 may comprise a display on which the job matching result is displayed. The matching module 110 and the information module 114 may be part of a single computing device. However, the matching module 110 may be part of a separate computing device, possible a remote server, wherein only the job matching result is communicated via the information module 114 to the user 118.

The information module 114 may display, associated with the job matching results, the corresponding candidate profiles 502 and/or the corresponding vacancy profiles 504, or part thereof, to the user.

The system further comprises a feedback module 122. The feedback module is connected in communication 124 to the matching module 110. The feedback module 110 is configured to receive 120 feedback information from the user 118 on at least part of the job matching result. Foremost, the feedback information is used to update and improve the matching module 110, to obtain better matching results when the system is used again in the future. The feedback information is associated with at least one of the plurality of candidate categories and the plurality of vacancy categories. The feedback information may comprise information indicating that the user 118 considers a particular candidate or vacancy to be suitable, unsuitable, or partly suitable. The feedback information may also comprise information on particular categories. For example, a user 118 may indicate that a particular category is more important than another. Based on the feedback information, the matching module 110 is updated.

FIG. 2 depicts an embodiment of the matching module 110. The matching module 110 optionally comprises an encoding module 202 configured to encode candidate category data and vacancy category data. The data obtained from the candidate memory and/or vacancy memory may not be immediately suitable to be used in a machine learning algorithm such as a neural network. The encoding module 202 may perform steps such as normalization, tokenization etc. Also, unnecessary information may be removed. Once the candidate category data and the vacancy category data have been properly formatted and stored, the respective data is used as an input 210, 214 to a plurality of neural networks, in particular candidate neural networks 204 and vacancy neural networks 206. Various types of neural networks may be used such as convolutional neural networks, recurrent neural networks, multilayer perceptrons etc. Also, instead of neural networks also other machine learning techniques may be used such as support vector machines, Gaussian processes etc.

FIGS. 3 and 4 provide depict in more detail the candidate neural networks 204 and the vacancy neural networks 206, respectively.

The matching module 110 comprises a plurality of candidate category neural networks. In FIG. 3 two candidate category neural networks are displayed, 302, 304. Each candidate category neural network 302, 304 is associated with a respective candidate category and has as input 310, 312 for the specific candidate category data, which may be encoded. Each of the candidate category neural networks 302, 304 determines, based on the (optionally encoded) candidate category data 310, 312 a respective candidate category representation for each candidate. Such a candidate category representation is commonly a multi-dimensional vector comprising various numbers.

The matching module 110 further comprises a candidate super-category neural network 306, configured to receive 314, 316 from the candidate category neural networks 302, 304 a plurality of candidate category representations. Based on the plurality of candidate category representations, the candidate super-category neural network 306 determines a candidate super-category representation for each candidate, which is associated with the respective candidate profile. Therefore, the candidate super-category neural network 306 obtains a representation, i.e. the candidate super-category representation, of the overall candidate profile. This representation is obtained by combining or aggregating, by the candidate super-category neural network 306, the various candidate category representations associated with specific categories. Whereas the candidate super-category representation represents the overall candidate profile, the candidate category representations may provide representations of the candidate profile that are associated with specific categories, and therefore may provide or contain more detailed information regarding the specific categories.

Referring to FIG. 4, similarly to the candidate category neural networks 302, 304, the matching module 110 comprises a plurality of vacancy category neural networks 402, 404, wherein each of the vacancy category neural networks 402, 404 is associated with a respective vacancy category. A respective vacancy category neural network 402, 404 is configured to receive 410, 412 from the vacancy category neural networks 402, 404 the vacancy category data and to determine a respective vacancy category representation for each vacancy.

Also, the matching module 110 comprises a vacancy super-category neural network 406, configured to receive 414, 416 a plurality of vacancy category representations and to determine a vacancy super-category representation for each vacancy, which is associated with the respective vacancy profile. Therefore, the vacancy super-category neural network 406 obtains a representation, i.e. the vacancy super-category representation, of the overall vacancy profile. This representation is obtained by combining or aggregating, by the vacancy super-category neural network 406, the various vacancy category representations associated with specific categories. Whereas the vacancy super-category representation represents the overall vacancy profile, the vacancy category representations may provide representations of the vacancy profile that are associated with specific categories, and therefore may provide or contain more detailed information regarding the specific categories.

Figure 9:
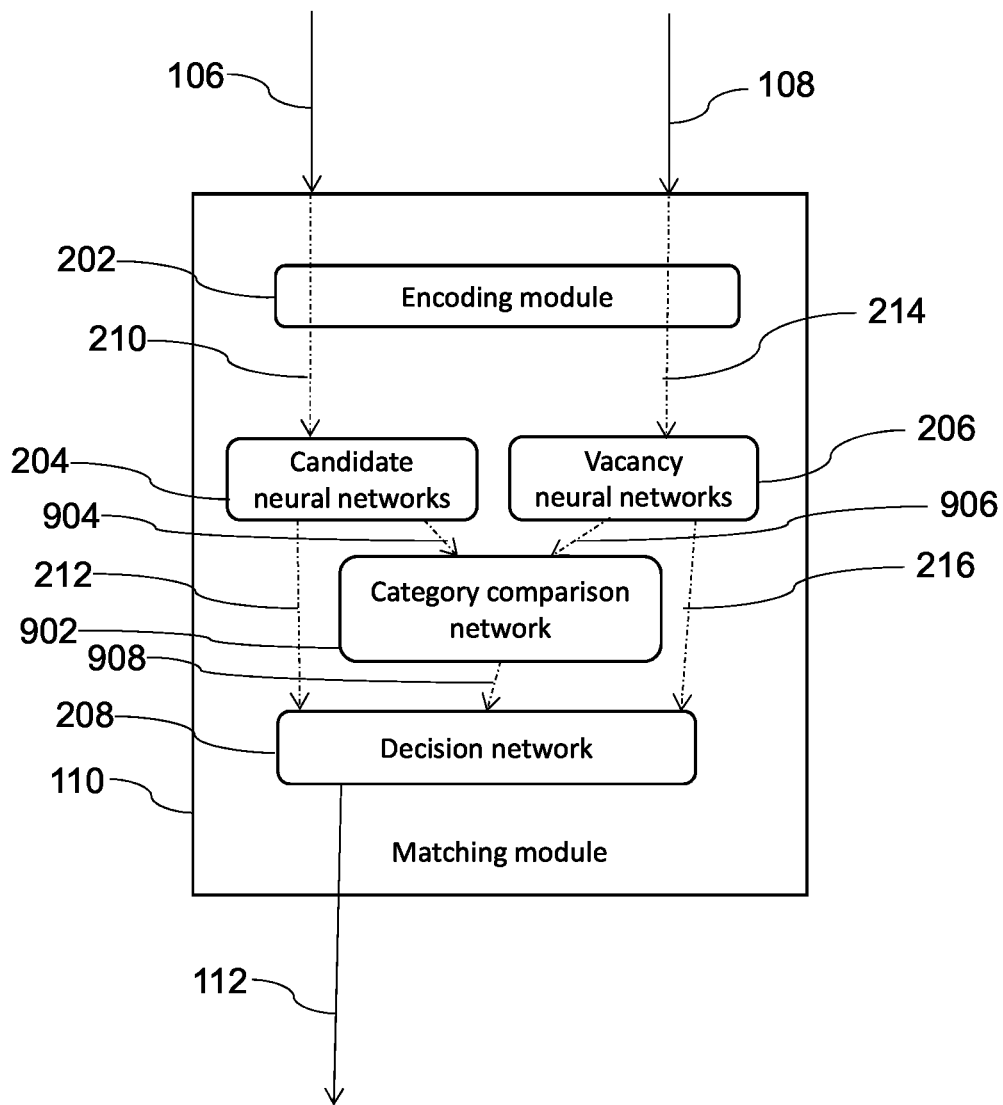
FIG. 9 depicts the matching module of FIG. 2, further comprising an embodiment of a category comparison network.

By comparing the candidate super-category representation with the vacancy super-category representation it is possible to compare the overall candidate profile with the overall vacancy profile. By comparing a candidate category representation with the respective vacancy category representation a candidate profile 502 and a vacancy profile 504 may be compared on a category level. FIG. 9 further illustrates the comparison of a candidate category representation with the respective vacancy category representation.

The various representations associated with each vacancy are also vectors.

Referring to FIG. 2, the matching module 110 further comprises a decision network 208, configured to receive 212 the at least one candidate super-category representation and 216 the at least one vacancy super-category representation. The decision network 208 is configured to determine at least one similarity score between the at least one candidate super-category representation and the at least one vacancy super-category representation.

Each similarity score is determined based on a mathematical distance between a respective candidate super-category representation and a respective vacancy super-category representation.

The respective similarity score may be based on the cosine similarity between a respective candidate super-category representation and a respective vacancy super-category representation. The cosine similarity is a measure of similarity between the two vectors (that may reside in an inner product space) and measures the cosine of the angle between them. Alternative to the cosine similarity, other measures to compare two vectors may be used as well.

In an embodiment, the candidate category neural networks 302, 304 are substantially equal to the respective vacancy category neural networks 402, 404. One may refer to this principle as the use of Siamese networks. In case a neural network needs be retrained, it is possible to retrain e.g. only a candidate neural network 302, 304, and then use a copy of that neural network as the corresponding vacancy category neural network 402, 404. Alternatively, the candidate category neural networks 302, 304 may also serve as the vacancy category neural networks 402, 404, or vice versa.

For the same reasons of efficiency, the candidate super-category neural network 306 may be substantially equal to the vacancy super-category neural network 406. Also the candidate super-category neural network 306 may serve as the vacancy super-category neural network 406.

FIG. 9 depicts an embodiment of a matching module 110, wherein the matching module 110 comprises at least one category comparison network 902. The category comparison network 902 is configured to receive a signal 904 comprising a candidate category representation and to receive a signal 906 comprising a vacancy category representation in an associated category. The category comparison network 902 is further configured to determine a category similarity score between the candidate category representation and the associated vacancy category representation. The category similarity score is provided 908 to the decision network 208.

Figure 6:
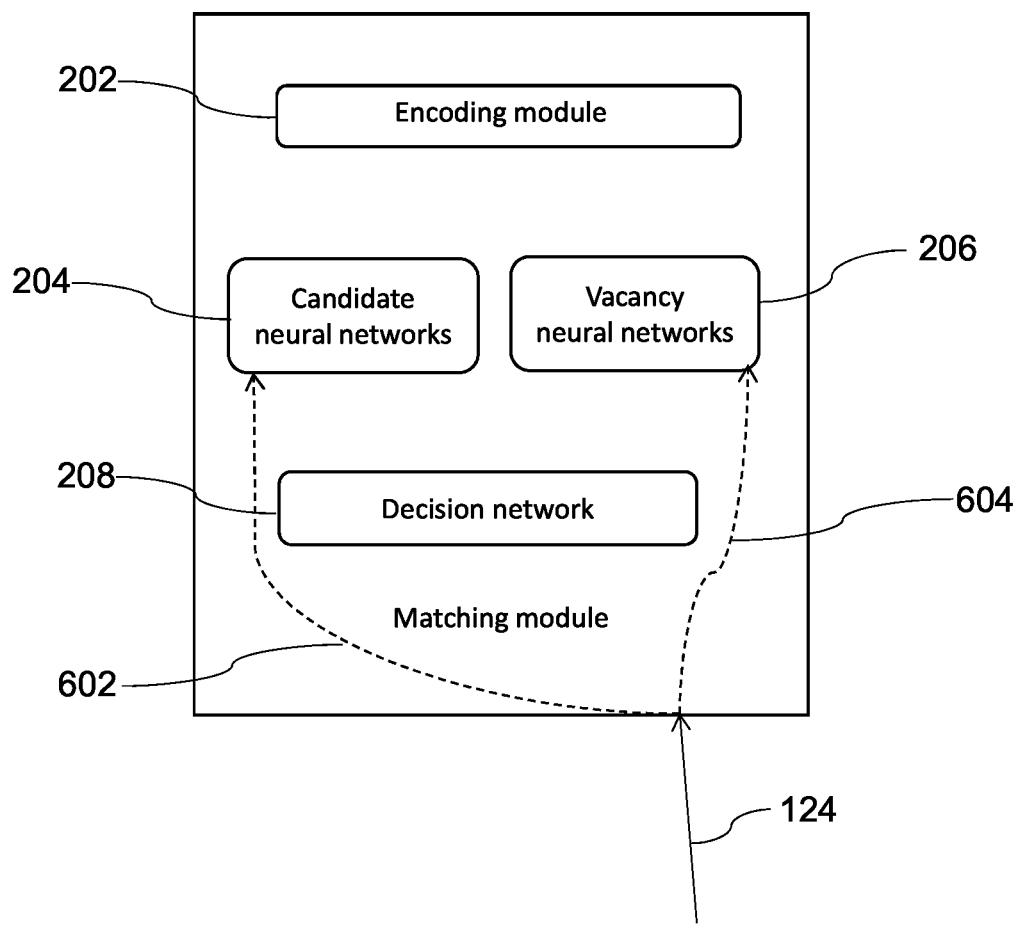
FIG. 6 depicts an embodiment of the matching module, wherein the matching module is updated.
Figure 7:
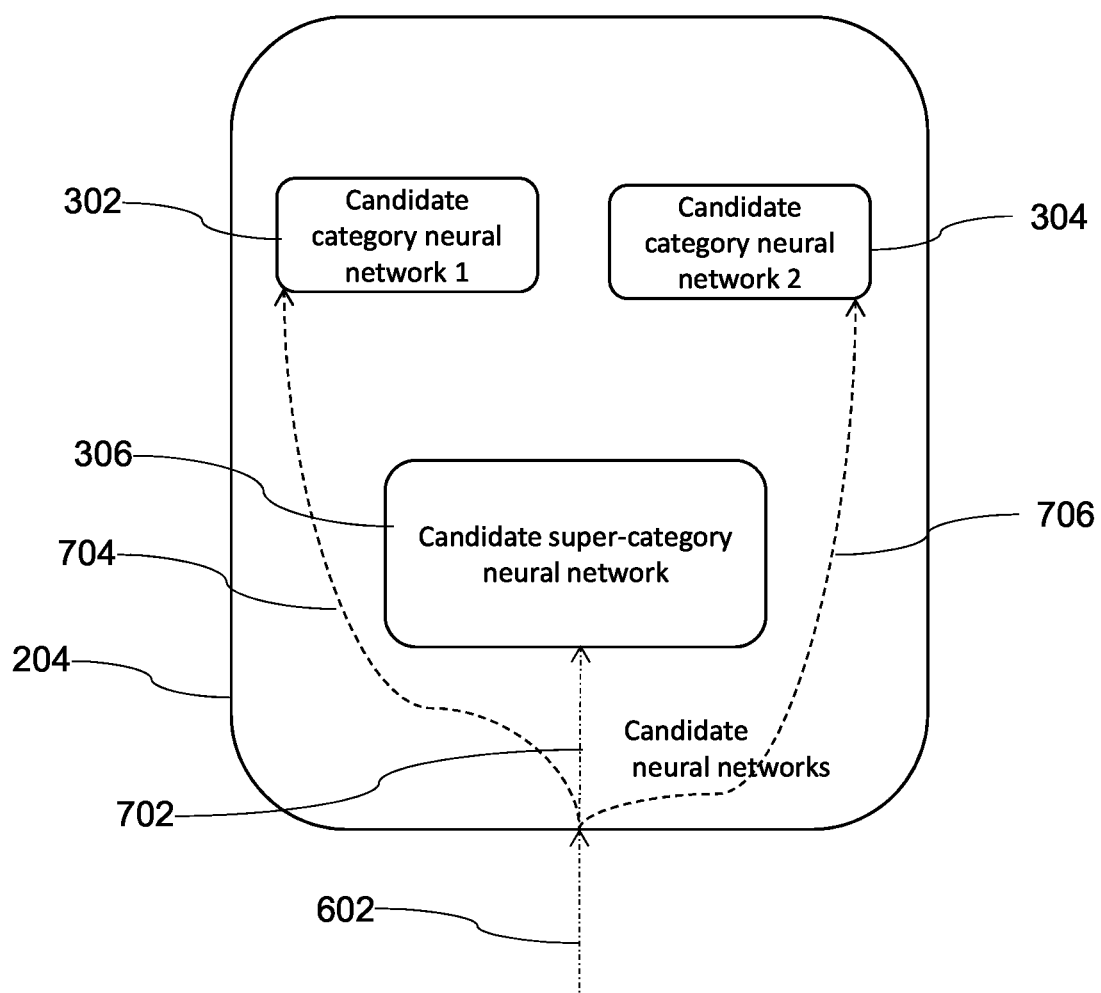
FIG. 7 depicts in more detail the candidate neural networks of FIG. 6.
Figure 8:
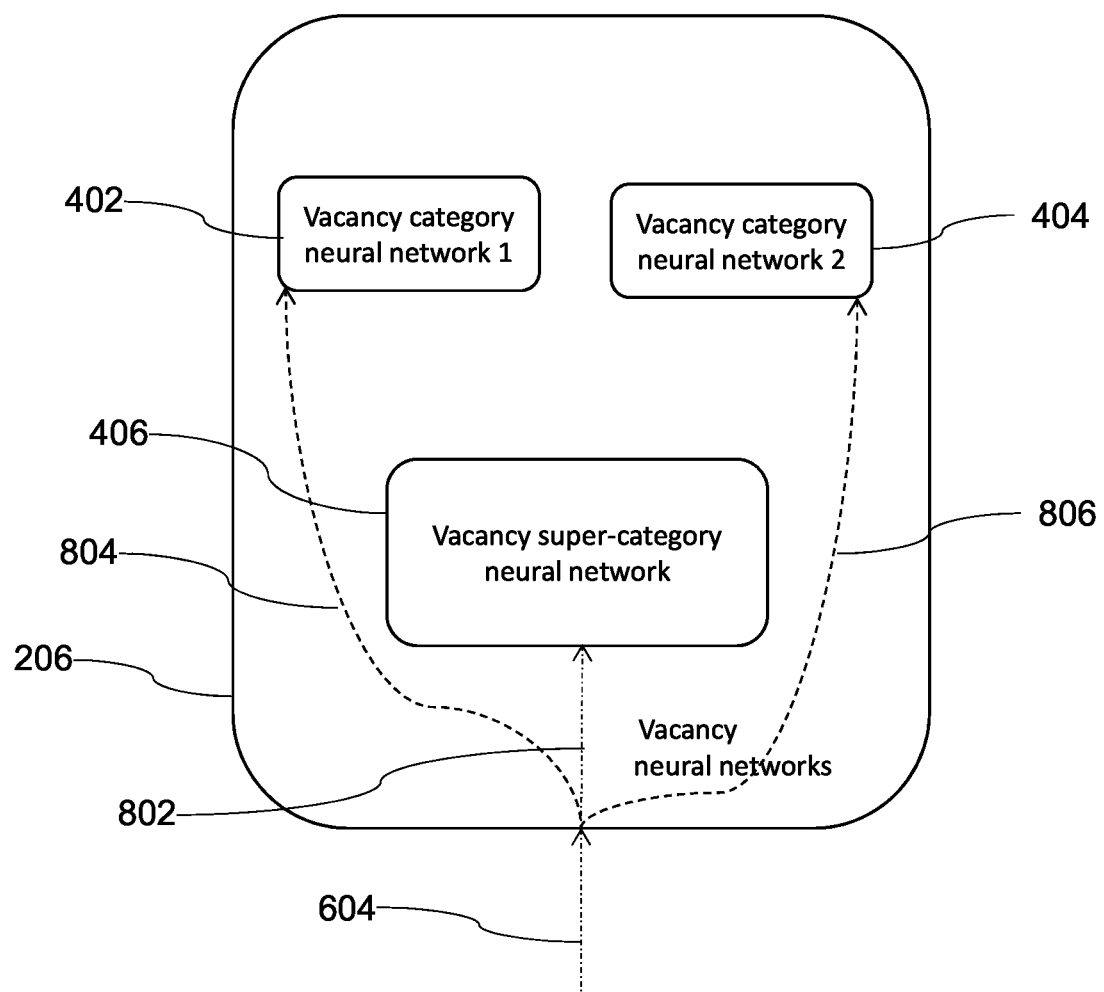
FIG. 8 depicts in more detail the vacancy neural networks of FIG. 6.

FIGS. 6 to 8 illustrate how feedback by a user 118 is used to update various components in the system. Updating may refer to training or learning a neural network.

Feedback information received 120 by the feedback module 122 is associated with at least one of a specific candidate category and a specific vacancy category. The candidate category neural network 302, 304 associated with the respective specific candidate category is updated based on the feedback information associated with the specific candidate category. The vacancy category neural network 402, 404 associated with the respective specific vacancy category is updated based on the feedback information associated with the specific vacancy category.

Also, the candidate super-category neural network 306 may be updated 702 based on the feedback information. The feedback information or part thereof may be associated with a specific candidate category. Similarly, the vacancy super-category neural network 406 may updated 802 based on the feedback information. Also, the feedback information or part thereof may be associated with a specific vacancy category.

Referring to FIG. 6, the matching module 110 receives 124 feedback information from the feedback module 122. The feedback information, or part of the feedback information is then received 602 by the candidate neural networks 204. Also, the feedback information, or part of the feedback information is received 604 by the vacancy neural networks 206.

FIG. 7 further illustrates how the received 602 feedback information is further used to update the candidate neural networks 204. The received 602 feedback information, or part thereof, may be used to update 702 the candidate super-category neural network 306, to update 704 the candidate category neural network 302 and/or to update 706 the candidate category neural network 304. The arrows 702, 704, 706 indicate the updating, but may also indicate how the feedback information is transmitted. The feedback information which may be sent 704 to the candidate category neural network 302, may be different from the feedback information which may be sent 706 to the candidate category neural network 304. In particular, it may be beneficial to only send part of the feedback information to a candidate category neural network 302, 304 if the part of the feedback information is associated with the respective candidate category neural network 302, 304. For example, if the feedback information comprises specific information on the language category, e.g. based on the corresponding category similarity score, the information on the language category may only be sent to the language category neural network associated with the candidate.

Feedback information may also contain information which may not be associated with a specific category. Such information may be used to update 702 the candidate super-category neural network 306. Also feedback information which is associated with a specific category, may be used to update 702 the candidate super-category neural network 306.

FIG. 8 further illustrates how the received 604 feedback information is further used to update the vacancy neural networks 206. The received 604 feedback information, or part thereof, may be used to update 802 the vacancy super-category neural network 406, to update 804 the vacancy category neural network 402 and/or to update 806 the vacancy category neural network 404. The arrows 802, 804, 806 indicate the updating, but may also indicate how the feedback information is transmitted. The feedback information which may be sent 804 to the vacancy category neural network 402, may be different from the feedback information which may be sent 806 to the vacancy category neural network 404. In particular, it may be beneficial to only send part of the feedback information to a vacancy category neural network 402, 404 if the part of the feedback information is associated with the respective vacancy category neural network 402, 404. For example, if the feedback information comprises specific information on the language category, e.g. based on the corresponding category similarity score, the information on the language category may only be sent to the language category neural network associated with the vacancy.

Feedback information may also contain information which may not be associated with a specific category. Such information may be used to update 802 the vacancy super-category neural network 406. Also feedback information which is associated with a specific category, may be used to update 802 the vacancy super-category neural network 406.

Feedback information used to update candidate neural networks 204 may also be used to update vacancy neural networks 206.

Updating of neural networks, or of other machine learning related components, may be known in the art per se. Updating may also be referred to as learning or training. Cost or loss functions, such as cross entropy loss functions, may be associated with each of the candidate neural networks 204 and with each of the vacancy neural networks 206 or with the feedback information. Based on the feedback information, specific parameters in the neural networks may be updated, using various techniques, to minimize the respective cost functions. Generally, some gradient descent algorithms, such as conjugate gradient algorithms or quasi-Newton algorithms, are used to determine changes in the parameters, whereas backpropagation or equilibrium propagation may be used to determine the associated gradients.

The feedback module 122 may be configured to associate the feedback information with a cost function. Based on the feedback information, an appropriate cost function may be selected or determined. The cost function may be associated with at least one of the plurality of candidate category neural networks 302, 304, the plurality of vacancy category neural networks 402, 404, the candidate super-category neural network 306 or the vacancy super-category neural network 406. For example, a cost function may be associated with a neural network when the outcome or cost of the cost function depends on the outcome of the respective neural network. For example, the cost function may depend on at least one candidate category representation 302, 304. The feedback module 122 may be configured to optimize a cost associated with the cost function by updating at least one of the plurality of candidate category neural networks 302, 304, the plurality of vacancy category neural networks 402, 404, the candidate super-category neural network 306 or the vacancy super-category neural network 406, associated with the respective cost function. Optimizing a cost function may refer to minimizing or maximizing the cost associated with the cost function.

The feedback module 122 may further be configured to associate the received feedback information with a type of feedback. A type of feedback may comprise information whether the feedback is quantitative or qualitative. Based on the type of feedback the cost function may be determined. A type of feedback may comprise information on which candidate categories or vacancy categories feedback information is obtained. The feedback module 122 may therefore be configured to determine on which categories feedback information is received, wherein the categories are selected from the candidate categories and the vacancy categories and to determine the type of feedback based on the categories on which feedback information is received.

The feedback module 122 may be configured to receive feedback information without requiring the user 118 to identify the feedback information as being feedback on at least part of the job matching result. For example, the feedback module 122 may determine the amount of time information associated with a candidate, such as the candidate profile 502, is viewed by a user. In case viewing of information associated with a candidate takes a predetermined amount of time within a predetermined time period, implicit information may be obtained on the candidate, such as the suitability or unsuitability of the respective candidate. This implicit feedback information may be used to update the candidate super-category neural network 306 or the vacancy super-category neural network 406.

Figure 10:
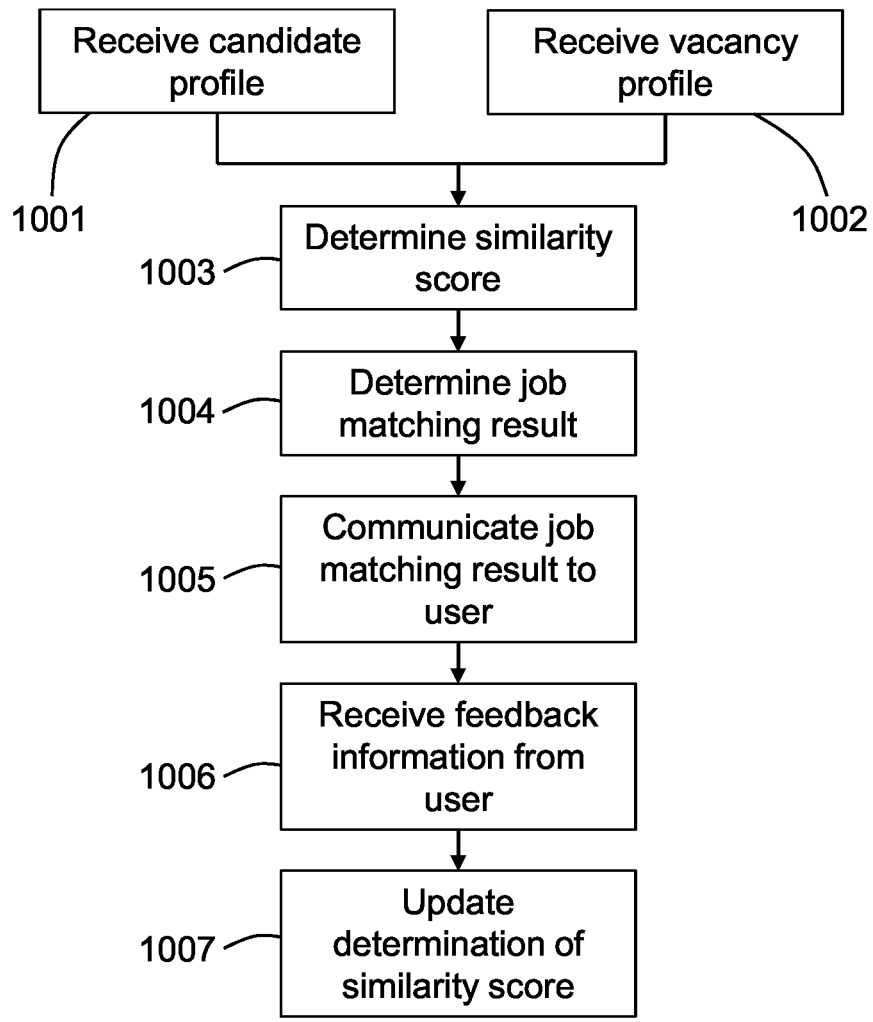
FIG. 10 depicts a flow diagram of a computer-implemented method for job matching of candidates and vacancies, performed by the system depicted in FIG. 1.

FIG. 10 depicts a flow diagram of a computer-implemented method for job matching of candidates and vacancies, performed by the system depicted in FIG. 1.

In a step 1001 of the method, data of at least one candidate profile is received, wherein each candidate profile is associated with a respective candidate and consists of a plurality of different candidate categories, and wherein each candidate category comprises candidate category data associated with the candidate. The data are received from a candidate memory.

In a step 1002, data of at least one vacancy profile is received, wherein each vacancy profile is associated with a respective vacancy and consists of a plurality of different vacancy categories, and wherein each vacancy category comprises vacancy category data associated with the vacancy. The data are received from a vacancy memory. The steps 1001 and 1002 may be performed in arbitrary order, and also substantially simultaneously.

In a step 1003, at least one similarity score between the at least one candidate profile and the at least one vacancy profile, received in steps 1001 and 1002, is determined.

In a step 1004, a job matching result is determined, based on the at least one similarity score determined in step 1003.

Steps 1003 and 1004 may be performed by a matching module.

In a step 1005, the job matching result determined in step 1004 is communicated to a user, by an information module.

In a step 1006, feedback information is received from the user on at least part of the job matching result determined in step 1004, wherein the feedback information is associated with at least one of the plurality of candidate categories and the plurality of vacancy categories. The feedback information is received by a feedback module.

In a step 1007, the determination of the at least one similarity score according to step 1003 is updated, based on the received feedback information.

Figure 11:
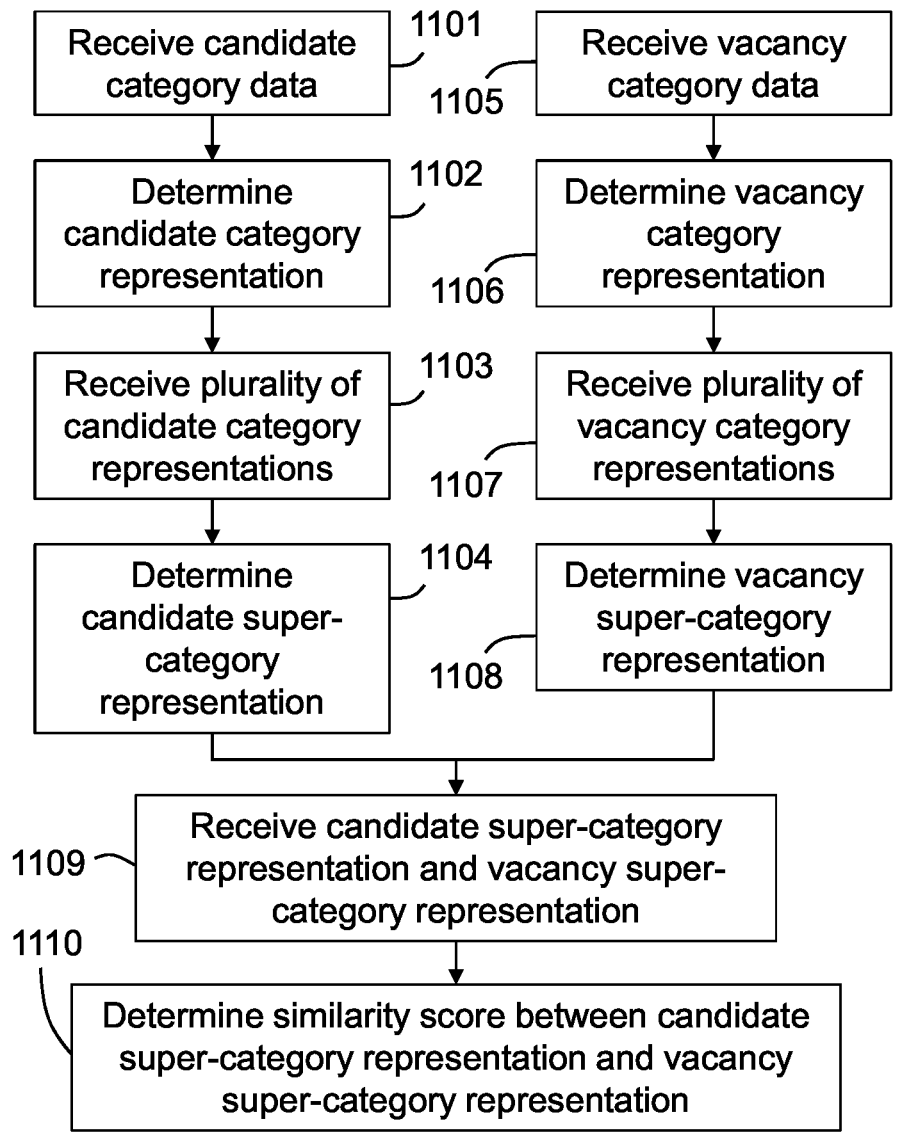
FIGS. 11 to 15 depict respective flow diagrams of a part of a computer-implemented method for job matching of candidates and vacancies, performed by the system depicted in FIG. 1.

FIG. 11 depicts a flow diagram of a part of a computer-implemented method for job matching of candidates and vacancies, performed by the matching module of the system depicted in FIG. 1, in particular directed to the use of candidate category neural networks, vacancy category neural networks, a candidate super-category neural network, and a vacancy super-category neural network.

In a step 1101, a candidate category neural network receives the candidate category data, wherein the candidate category neural network is one of a plurality of candidate category neural networks, and wherein each one of the candidate category neural networks is associated with a respective candidate category.

In a step 1102 following step 1101, the respective candidate category neural network determines a respective candidate category representation for each candidate.

In a step 1103 following step 1102, a candidate super-category neural network receives a plurality of candidate category representations.

In a step 1104 following step 1103, the candidate super-category neural network determines a candidate super-category representation for each candidate.

In a step 1105, a vacancy category neural network receives the vacancy category data, wherein the vacancy category neural network is one of a plurality of vacancy category neural networks, and wherein each one of the vacancy category neural networks is associated with a respective vacancy category.

In a step 1106, the respective vacancy category neural network determines a respective vacancy category representation for each vacancy.

In a step 1107, a vacancy super-category neural network receives a plurality of vacancy category representations.

In a step 1108, the vacancy super-category neural network determines a vacancy super-category representation for each vacancy.

Steps 1101 to 1104 on the one hand, and steps 1105 to 1108 on the other hand, can be performed in arbitrary order, or substantially simultaneously.

In a step 1109 following steps 1104 and 1108 after their completion, a decision network receives at least one candidate super-category representation and at least one vacancy super-category representation.

In a step 1110 following step 1109, the decision network determines at least one similarity score between the at least one candidate super-category representation and the at least one vacancy super-category representation.

Figure 12:
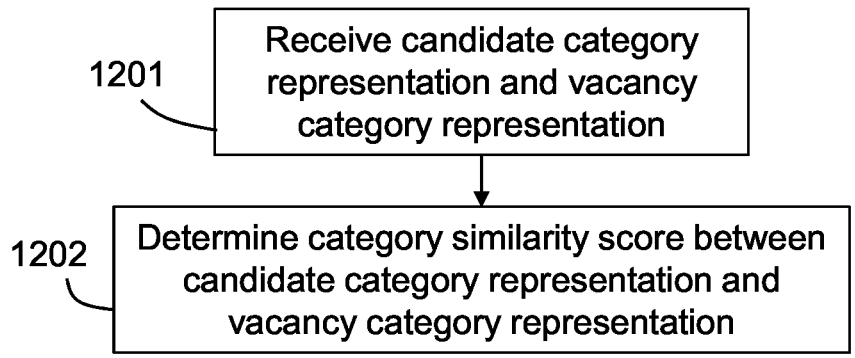

FIG. 12 depicts a flow diagram of a part of a computer-implemented method for job matching of candidates and vacancies, performed by the system depicted in FIG. 1.

In a step 1201, at least one category comparison network receives a candidate category representation and an associated vacancy category representation.

In a step 1202 following step 1201, the at least one category comparison network determines a category similarity score between the candidate category representation and the associated vacancy category representation.

Figure 13:
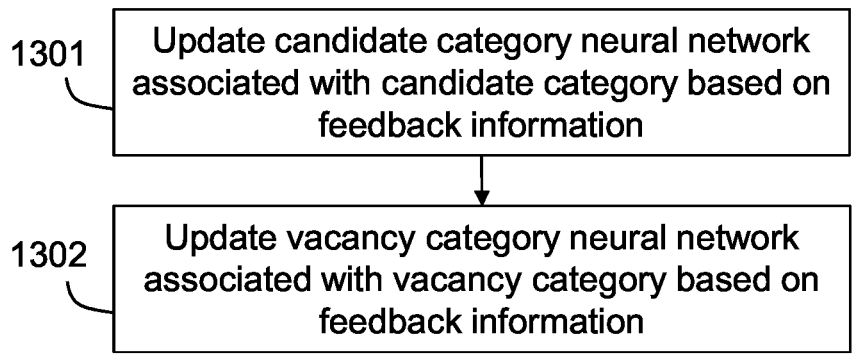
Figure 14:
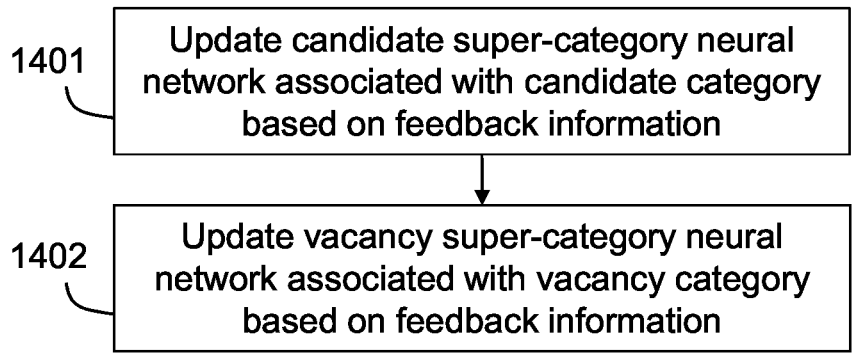
Figure 15:
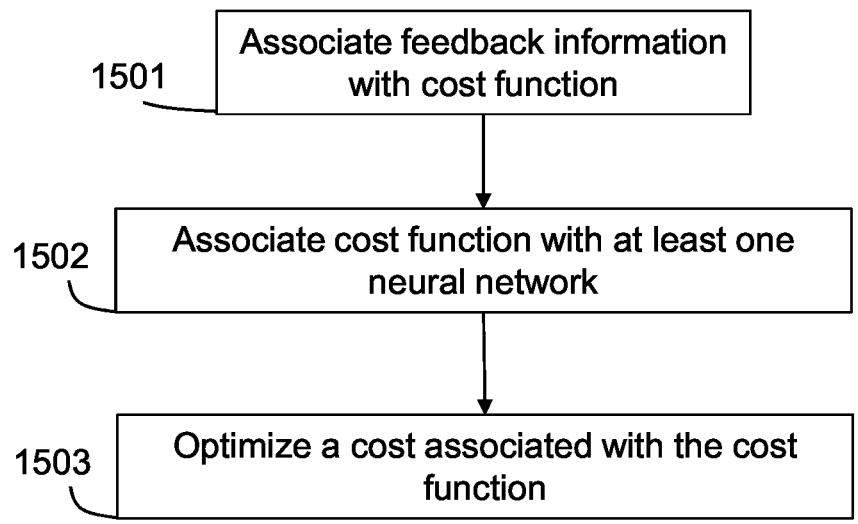

FIGS. 13, 14 and 15 depict respective flow diagrams of a part of a computer-implemented method for job matching of candidates and vacancies, performed by the system depicted in FIG. 1, in particular for processing the feedback information, wherein the received feedback information is associated with at least one of a specific candidate category and a specific vacancy category.

In a step 1301, the candidate category neural network associated with the specific candidate category is updated, based on the feedback information associated with the specific candidate category.

In a step 1302, the vacancy category neural network associated with the specific vacancy category is updated, based on the feedback information associated with the specific vacancy category.

Steps 1301 and 1302 can be performed in any order, or substantially simultaneously.

In a step 1401, the candidate super-category neural network is updated, based on the feedback information associated with the specific candidate category In a step 1402, the vacancy super-category neural network is updated, based on the feedback information associated with the specific vacancy category.

Steps 1401 and 1402 can be performed in any order, or substantially simultaneously.

In a step 1501, feedback information is associated with a cost function. Associating a cost function with the feedback information may comprise associating the received feedback information with a type of feedback and determining the cost function based on the type of feedback. Associating the received feedback information with a type of feedback may comprise determining on which categories feedback information is received, wherein the categories are selected from the candidate categories and the vacancy categories, and determining the type of feedback based on the categories on which feedback information is received.

In a step 1502, the cost function is associated with at least one of the plurality of candidate category neural networks, plurality of vacancy category neural networks, candidate super-category neural network or vacancy super-category neural network.

In a step 1503, a cost associated with the cost function is optimized by updating at least one of the plurality of candidate category neural networks, plurality of vacancy category neural networks, candidate super-category neural network or vacancy super-category neural network, associated with the respective cost function.

Figure 16:
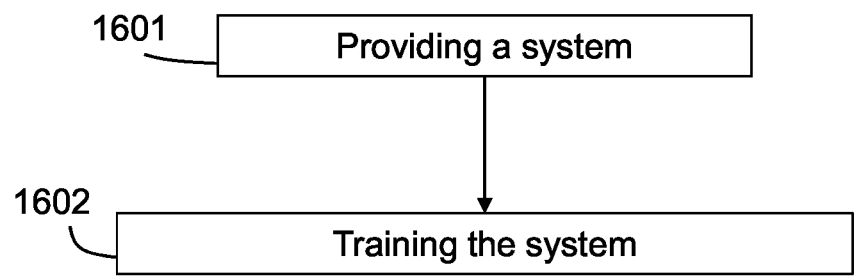
FIG. 16 depicts a flow diagram of a method of training a computer-implemented system for job matching of candidates and vacancies.

FIG. 16 depicts a flow diagram of a method of training a computer-implemented system for job matching of candidates and vacancies.

In a step 1601, a system is provided. In particular a system according to the invention may be provided.

In a step 1602, the provided system is trained.

The system provided in the step 1601 may comprise:
a candidate memory comprising data of at least one candidate profile, wherein each candidate profile is associated with a respective candidate and consists of a plurality of different candidate categories, wherein each candidate category comprises candidate category data associated with the candidate;

a vacancy memory comprising data of at least one vacancy profile, wherein each vacancy profile is associated with a respective vacancy and consists of a plurality of different vacancy categories, wherein each vacancy category comprises vacancy category data associated with the vacancy;

a matching module, connected in communication to the candidate memory and the vacancy memory, the matching module being configured to:
receive the at least one candidate profile;
receive the at least one vacancy profile;
determine at least one similarity score between the at least one candidate profile and the at least one vacancy profile; and
determine a job matching result based on the at least one similarity score;

an information module, connected in communication to the matching module, the information module being configured to communicate the job matching result to a user; and a feedback module, connected in communication to the matching module, the feedback module being configured to receive feedback information from the user on at least part of the job matching result.

In step 1602, the training may comprise the steps of:
associating the feedback information with at least one of the plurality of candidate categories and the plurality of vacancy categories, and updating the step of determining of the at least one similarity score between the at least one candidate profile and the at least one vacancy profile by the matching module based on the received feedback information.

The matching module of the system provided in the step 1601 may further comprise:
a plurality of candidate category neural networks, wherein each one of the candidate category neural networks is associated with a respective candidate category and wherein a respective candidate category neural network is configured to receive the candidate category data and to determine a respective candidate category representation for each candidate; and a plurality of vacancy category neural networks, wherein each one of the vacancy category neural networks is associated with a respective vacancy category and wherein a respective vacancy category neural network is configured to receive the vacancy category data and to determine a respective vacancy category representation for each vacancy.

Then, the training in step 1602 may further comprise the steps of:
determining at least one similarity score between the at least one candidate profile and at least one vacancy profile by determining a similarity score between at least one candidate category representation and at least one vacancy category representation; and
associating the feedback information with at least one of the plurality of candidate category representations and the plurality of vacancy category representations, and updating at least one of the candidate category neural networks and the vacancy category neural networks, respectively, based on the received feedback information.

The matching module of the system provided in the step 1601 may further comprise:
a candidate super-category neural network, configured to receive a plurality of candidate category representations and to determine a candidate super-category representation for each candidate; and a vacancy super-category neural network, configured to receive a plurality of vacancy category representations and to determine a vacancy super-category representation for each vacancy, Then, the training in step 1602 may further comprise the steps of:
determining at least one similarity score between the at least one candidate profile and at least one vacancy profile by determining a similarity score between at least one candidate super-category representation and at least one vacancy super-category representation; and
associating the feedback information with at least one of the plurality of candidate super-category representations and the plurality of vacancy super-category representations, and updating at least one of the candidate super-category neural networks and the vacancy super-category neural networks, respectively, based on the received feedback information.

As explained in detail above, a computer-implemented method and system for job matching of candidates and vacancies is disclosed. The system comprises: a candidate memory storing data of at least one candidate profile associated with a respective candidate and consisting of a plurality of different candidate categories, wherein each candidate category comprises candidate category data associated with the candidate; and a vacancy memory storing data of at least one vacancy profile associated with a respective vacancy and consisting of a plurality of different vacancy categories, wherein each vacancy category comprises vacancy category data associated with the vacancy. A matching module is configured to receive the at least one candidate profile, receive the at least one vacancy profile, determine at least one similarity score between the at least one candidate profile and the at least one vacancy profile, and determine a job matching result based on the at least one similarity score. An information module is configured to communicate the job matching result to a user. A feedback module is configured to receive feedback information associated with at least one of the plurality of candidate categories and the plurality of vacancy categories. The matching module is updated based on the received feedback information.

As required, detailed embodiments of the present invention are disclosed herein; however, it is to be understood that the disclosed embodiments are merely exemplary of the invention, which can be embodied in various forms. Therefore, specific structural and functional details disclosed herein are not to be interpreted as limiting, but merely as a basis for the claims and as a representative basis for teaching one skilled in the art to variously employ the present invention in virtually any appropriately detailed structure. Further, the terms and phrases used herein are not intended to be limiting, but rather, to provide an understandable description of the invention.

The terms "a" or "an", as used herein, are defined as one or more than one. The term plurality, as used herein, is defined as two or more than two. The term another, as used herein, is defined as at least a second or more. The terms including and/or having, as used herein, are defined as comprising (i.e., open language, not excluding other elements or steps). Any reference signs in the claims should not be construed as limiting the scope of the claims or the invention.

The mere fact that certain measures are recited in mutually different dependent claims does not indicate that a combination of these measures cannot be used to advantage.

The term coupled, as used herein, is defined as connected, or in communication with, although not necessarily directly.

What is claimed is:

1. A computer-implemented system for job matching of candidates and vacancies, the system comprising:
   a candidate memory comprising data of at least one candidate profile, wherein each candidate profile is associated with a respective candidate and consists of a plurality of different candidate categories, wherein each candidate category comprises candidate category data associated with the candidate;
   a vacancy memory comprising data of at least one vacancy profile, wherein each vacancy profile is associated with a respective vacancy and consists of a plurality of different vacancy categories, wherein each vacancy category comprises vacancy category data associated with the vacancy;
   a matching module, connected in communication to the candidate memory and the vacancy memory, the matching module being configured to, upon execution by one or more data processors:
      receive the at least one candidate profile;
      receive the at least one vacancy profile;
      determine at least one similarity score based on the at least one candidate profile and the at least one vacancy profile; and
      determine a job matching result based on the at least one similarity score;
   an information module, connected in communication to the matching module, the information module being configured to, upon execution by the one or more data processors, communicate the job matching result to a user; and
   a feedback module, connected in communication to the matching module, the feedback module being configured to, upon execution by the one or more data processors, receive feedback information from the user on at least part of the job matching result, wherein the feedback information is associated with at least one of the plurality of candidate categories and the plurality of vacancy categories, and to update the matching module based on the received feedback information,
   wherein the matching module comprises:
      a plurality of candidate category neural networks, wherein each one of the candidate category neural networks is associated with a respective candidate category and wherein a respective candidate category neural network is configured to receive the candidate category data and to determine a respective candidate category representation for each candidate;
      a candidate super-category neural network, configured to receive a plurality of candidate category representations and to determine a candidate super-category representation for each candidate;
      a plurality of vacancy category neural networks, wherein each one of the vacancy category neural networks is associated with a respective vacancy category and wherein a respective vacancy category neural network is configured to receive the vacancy category data and to determine a respective vacancy category representation for each vacancy; and
      a vacancy super-category neural network, configured to receive a plurality of vacancy category representations and to determine a vacancy super-category representation for each vacancy,
   wherein the matching module further comprises a decision network, configured to receive at least one candidate super-category representation and at least one vacancy super-category representation, the decision network further being configured to determine at least one similarity score between the at least one candidate super-category representation and the at least one vacancy super-category representation.

2. The system according to claim 1, wherein the matching module comprises an encoding module configured to encode candidate category data and vacancy category data.

3. The system according to claim 1, wherein each similarity score is determined based on a mathematical distance between a respective candidate super-category representation and a respective vacancy super-category representation.

4. The system according to claim 1, wherein the matching module comprises at least one category comparison network configured to receive a candidate category representation and an associated vacancy category representation, the category comparison network further being configured to determine a category similarity score between the candidate category representation and the associated vacancy category representation.

5. The system according to claim 1, wherein the candidate category neural networks are substantially equal to the respective vacancy category neural networks.

6. The system according to claim 1, wherein the candidate super-category neural network is substantially equal to the vacancy super-category neural network.

7. The system according to claim 1, wherein at least one candidate category is selected from a group of candidate categories comprising: skills, experiences, educations, languages, certificates and preferences.

8. The system according to claim 1, wherein the feedback information received by the feedback module is associated with at least one of a specific candidate category and a specific vacancy category, and wherein the candidate category neural network associated with the specific candidate category is updated based on the information associated with the specific candidate category, and wherein the vacancy category neural network associated with the specific vacancy category is updated based on the information associated with the specific vacancy category.

9. The system according to claim 1, wherein the feedback information received by the feedback module is associated with at least one of a specific candidate category and a specific vacancy category, and wherein the candidate super-category neural network is updated based on the information associated with the specific candidate category, and wherein the vacancy super-category neural network is updated based on the information associated with the specific vacancy category.

10. The system according to claim 1, wherein the updating comprises the use of back-propagation in combination with a cross-entropy loss function.

11. The system according to claim 1, wherein the feedback module further is configured to:
   associate the feedback information with a cost function;
   associate the cost function with at least one of the plurality of candidate category neural networks, plurality of vacancy category neural networks, candidate super-category neural network or vacancy super-category neural network; and
   optimize a cost associated with the cost function by updating at least one of the plurality of candidate category neural networks, plurality of vacancy category neural networks, candidate super-category neural network or vacancy super-category neural network, associated with the respective cost function.

12. The system according to claim 11, wherein the feedback module further is configured to:
   associate the received feedback information with a type of feedback; and
   determine the cost function based on the type of feedback.

13. The system according to claim 12, wherein the feedback module further is configured to:
   determine on which categories feedback information is received, wherein the categories are selected from the candidate categories and the vacancy categories; and
   determine the type of feedback based on the categories on which feedback information is received.

14. A computer-implemented method for job matching of candidates and vacancies, the method comprising a computer system carrying out the steps of:
   receiving data of at least one candidate profile, wherein each candidate profile is associated with a respective candidate and consists of a plurality of different candidate categories, wherein each candidate category comprises candidate category data associated with the candidate;
   receiving data of at least one vacancy profile, wherein each vacancy profile is associated with a respective vacancy and consists of a plurality of different vacancy categories, wherein each vacancy category comprises vacancy category data associated with the vacancy;
   receiving, by a candidate category neural network, the candidate category data, wherein the candidate category neural network is one of a plurality of candidate category neural networks, and wherein each one of the candidate category neural networks is associated with a respective candidate category;
   determining, by the respective candidate category neural network, a respective candidate category representation for each candidate;
   receiving, by a candidate super-category neural network, a plurality of candidate category representations;
   determining, by the candidate super-category neural network, a candidate super-category representation for each candidate;
   receiving, by a vacancy category neural network, the vacancy category data, wherein the vacancy category neural network is one of a plurality of vacancy category neural networks, and wherein each one of the vacancy category neural networks is associated with a respective vacancy category;
   determining, by the respective vacancy category neural network, a respective vacancy category representation for each vacancy;
   receiving, by a vacancy super-category neural network, a plurality of vacancy category representations;
   determining by the vacancy super-category neural network, a vacancy super-category representation for each vacancy;
   receiving, by a decision network, at least one candidate super-category representation and at least one vacancy super-category representation;
   determining, by the decision network, at least one similarity score between the at least one candidate super-category representation and the at least one vacancy super-category representation;
   determining a job matching result based on the at least one similarity score;
   communicating the job matching result to a user;
   receiving feedback information from the user on at least part of the job matching result, wherein the feedback information is associated with at least one of the plurality of candidate categories and the plurality of vacancy categories; and
   updating the determination of the at least one similarity score, based on the received feedback information.

15. The method according to claim 14, further comprising the computer system carrying out the steps of:
   receiving, by at least one category comparison network, a candidate category representation and an associated vacancy category representation; and
   determining, by the at least one category comparison network, a category similarity score between the candidate category representation and the associated vacancy category representation.

16. The method according to claim 14, wherein the received feedback information is associated with at least one of a specific candidate category and a specific vacancy category, the method further comprising the computer system carrying out the steps of:
   updating the candidate category neural network associated with the specific candidate category, based on the feedback information associated with the specific candidate category; and
   updating the vacancy category neural network associated with the specific vacancy category, based on the feedback information associated with the specific vacancy category.

17. The method according to claim 14, wherein the received feedback information is associated with at least one of a specific candidate category and a specific vacancy category, the method further comprising the computer system carrying out the steps of:
   updating the candidate super-category neural network, based on the feedback information associated with the specific candidate category; and
   updating the vacancy super-category neural network, based on the feedback information associated with the specific vacancy category.

18. The method according to claim 16, the method further comprising the computer system carrying out the steps of:
   associating the feedback information with a cost function;
   associating the cost function with at least one of the plurality of candidate category neural networks, plurality of vacancy category neural networks, candidate super-category neural network or vacancy super-category neural network; and
   optimizing a cost associated with the cost function by updating at least one of the plurality of candidate category neural networks, plurality of vacancy category neural networks, candidate super-category neural network or vacancy super-category neural network, associated with the respective cost function.

19. The method according to claim 18, wherein associating a cost function with the feedback information comprises:
   associating the received feedback information with a type of feedback; and
   determining the cost function based on the type of feedback.

20. The method according to claim 19, wherein associating the received feedback information with a type of feedback comprises:
   determining on which categories feedback information is received, wherein the categories are selected from the candidate categories and the vacancy categories; and determining the type of feedback based on the categories on which feedback information is received.

21. A method of training a computer-implemented system for job matching of candidates and vacancies, the system comprising:
- a candidate memory comprising data of at least one candidate profile, wherein each candidate profile is associated with a respective candidate and consists of a plurality of different candidate categories, wherein each candidate category comprises candidate category data associated with the candidate;
- a vacancy memory comprising data of at least one vacancy profile, wherein each vacancy profile is associated with a respective vacancy and consists of a plurality of different vacancy categories, wherein each vacancy category comprises vacancy category data associated with the vacancy;
- a matching module, connected in communication to the candidate memory and the vacancy memory, the matching module being configured to, upon execution by one or more data processors:
  - receive the at least one candidate profile;
  - receive the at least one vacancy profile;
  - determine at least one similarity score based on the at least one candidate profile and the at least one vacancy profile; and
  - determine a job matching result based on the at least one similarity score;
- an information module, connected in communication to the matching module, the information module being configured to, upon execution by the one or more data processors, communicate the job matching result to a user; and
- a feedback module, connected in communication to the matching module, the feedback module being configured to, upon execution by the one or more data processors, receive feedback information from the user on at least part of the job matching result, wherein the matching module further comprises:
- a plurality of candidate category neural networks, wherein each one of the candidate category neural networks is associated with a respective candidate category and wherein a respective candidate category neural network is configured to receive the candidate category data and to determine a respective candidate category representation for each candidate; and
- a plurality of vacancy category neural networks, wherein each one of the vacancy category neural networks is associated with a respective vacancy category and wherein a respective vacancy category neural network is configured to receive the vacancy category data and to determine a respective vacancy category representation for each vacancy; and wherein the training method further comprises the steps of:
- determining at least one similarity score between the at least one candidate profile and the at least one vacancy profile by determining a similarity score between at least one candidate category representation and at least one vacancy category representation; and
- associating the feedback information with at least one of the plurality of candidate category representations and the plurality of vacancy category representations, and updating at least one of the candidate category neural networks and the vacancy category neural networks, respectively, based on the received feedback information.

22. The training method according to claim 21, wherein the matching module further comprises:
- a candidate super-category neural network, configured to receive a plurality of candidate category representations and to determine a candidate super-category representation for each candidate; and
- a vacancy super-category neural network, configured to receive a plurality of vacancy category representations and to determine a vacancy super-category representation for each vacancy, wherein the training method further comprises the steps of:
- determining at least one similarity score between the at least one candidate profile and at least one vacancy profile by determining a similarity score between at least one candidate super-category representation and at least one vacancy super-category representation; and
- associating the feedback information with at least one of the plurality of candidate super-category representations and the plurality of vacancy super-category representations, and updating at least one of the candidate super-category neural networks and the vacancy super-category neural networks, respectively, based on the received feedback information.

* * * * *